United States Patent [19]
Wang et al.

[11] Patent Number: 5,659,707
[45] Date of Patent: Aug. 19, 1997

[54] TRANSFER LABELING MECHANISM FOR MULTIPLE OUTSTANDING READ REQUESTS ON A SPLIT TRANSACTION BUS

[75] Inventors: Shih-Chieh Wang, Taipei; Kang-Wei Chang, Hsin-Chu; Jiahn-Jung Chen, Kaohsiung, all of Taiwan

[73] Assignee: Industrial Technology Research Institute, Hsinchu, Taiwan

[21] Appl. No.: 320,520

[22] Filed: Oct. 7, 1994

[51] Int. Cl.$^6$ .................................................. G06F 13/00
[52] U.S. Cl. ......................... 395/472; 395/473; 395/290
[58] Field of Search ................................. 395/292, 294, 395/473, 290, 306, 309, 287, 289, 299, 472, 200.07

[56] References Cited

U.S. PATENT DOCUMENTS

| | | | |
|---|---|---|---|
| 4,785,394 | 11/1988 | Fischer | 395/294 |
| 4,977,498 | 12/1990 | Rastegar | 395/455 |
| 5,247,648 | 9/1993 | Watkins | 395/470 |
| 5,437,042 | 7/1995 | Culley | 395/200.07 |
| 5,459,840 | 10/1995 | Isfeld | 395/309 |
| 5,504,874 | 4/1996 | Galles | 395/472 |
| 5,568,620 | 10/1996 | Sarangdhar | 395/285 |
| 5,588,131 | 12/1996 | Borrin | 395/473 |

*Primary Examiner*—Tod R. Swann
*Assistant Examiner*—Christopher S. Chow
*Attorney, Agent, or Firm*—Meltzer, Lippe, Goldstein, et al.

[57] ABSTRACT

A labelling method and system are disclosed for correlating multiple outstanding requests to utilize a shared resource issued by a particular master of a computer system. The labelling system includes a memory for storing an assigned indication corresponding to each label assigned by each master of a computer system. The memory is also for indicating a label available for assignment which is unique over each outstanding, unsatisfied request to utilize the shared resource issued by each master of the computers system. The labelling system also includes a first circuit which is responsive to the unique label indicated by the memory. The first circuit is provided for assigning the unique label indicated by the memory to a request to utilize the shared resource issued by the particular master in which the labelling system is located.

33 Claims, 10 Drawing Sheets

TRANSFER LABELING MECHANISM FOR MULTIPLE OUTSTANDING READ REQUESTS ON A SPLIT TRANSACTION BUS

RELATED APPLICATION

The following patent applications are assigned to the assignee hereof and contain subject matter related to the present application:

1. U.S. patent application Ser. No. 08/071,721 entitled "Memory Consistent Pre-Ownership Method and System for Transferring Data Between an I/O Device and a Main Memory", filed Jun. 4, 1993 for Chang-Lun Chen, Allen S. C. Wang, and Wei-Wen Chang.

2. U.S. patent application Ser. No. 08/321,205, entitled "Efficient Fault Tolerant Memory Consistent Reflection Scheme" filed on even date herewith for Shih-Chieh WANG, Wei-Wen CHANG and Lu-Ping CHEN. The contents of the above-listed patent applications are incorporated herein by reference.

FIELD OF THE INVENTION

The present invention relates to computer systems which have devices called masters that utilize shared resources such as a shared memory, and a system bus. In particular, the present invention relates to a computer system in which at least one master can have one or more outstanding, unsatisfied request to utilize a shared resource. For example, at least one master can have more than one outstanding, unsatisfied command to read data from the shared memory via the system bus. In such a case, the retrieved data for each read command may return in an arbitrary order. The present invention provides a labelling mechanism which permits masters to correlate each data received from the shared memory to its corresponding outstanding request.

BACKGROUND OF THE INVENTION

A computer system 10 is depicted in FIG. 1. The computer system 10 includes a number of processors 11-1, 11-2, ..., 11-n, a cache memory 13-1, 13-2, ..., 13-n associated with each processor, a shared memory 14, and a number of I/O bridges 18-1, 18-2, ..., 18-n interconnected by a systems bus 16. The operation and function of these devices are discussed below.

The shared memory 14 has an array of storage locations for storing data. Each storage location is of a fixed size, e.g., eight bits, and is assigned a unique identifier called an address. These addresses specify the data storage locations which are the subject of data access (i.e., read and write) operations. The shared memory 14 receives data access commands, i.e., data read and data write commands, where each command contains an address specifying the particular storage locations to be accessed by the respective command.

Illustratively, the storage locations are further organized (for reasons described below) into contiguous, non-overlapping, fixed length sequences called data lines. For example, the storage locations may be organized into thirty-two byte long data lines. Each data line has a unique line address similar to the above-described storage location addresses for accessing the entire data line.

The system bus 16 is for transferring data, addresses and commands between the different devices connected thereto, i.e., the processors 11-1, 11-2, ..., 11-n, the cache memories 13-1, 13-2, ..., 13-n, the shared memory 14 and the I/O bridges 18-1, 18-2, ..., 18-n. As shown in FIG. 1, the system bus 16 comprises a data bus 16-1, for transferring data, a command bus 16-2, for transferring commands and addresses, and an arbitration bus 16-3, for use in allocating the system bus 16 to the other devices of the computer system 10. Illustratively, only one device may communicate via the system bus 16 at one time. The computer system 10 has an elaborate arbitration protocol for providing each device an opportunity to transfer data or commands on the system bus 16. The transfer of data and commands on the system bus 16 is discussed in greater detail below.

Each processor 11-1, 11-2, ..., 11-n is for executing instructions. In the course of executing the instructions, the processors 11-1 to 11-n generate a number of data access commands. In addition, the instructions themselves are stored as data in the shared memory 14.

Illustratively, each processor 11-1, 11-2, ..., 11-n is provided with a cache memory 13-1, 13-2, ..., 13-n. The cache memories 13-1 to 13-n are small high speed memories for maintaining a duplicate copy of particular data in the slower shared memory 14 that the processors 11-1 to 11-n frequently access. Despite their relatively small size, the cache memories 13-1 to 13-n drastically reduce the number of data accesses to the slower shared memory 14. This is because processor data accesses exhibit temporal and spatial locality of reference properties. Temporal locality of reference refers to the tendency of processors to repeatedly access the same data. This occurs, because of program flow control instructions such as loops, branches and subroutines, which tend to cause the processors 11-1 to 11-n to execute the same instructions repeatedly. By maintaining a local copy of the most recently accessed data, the cache memory 13-1 is able to satisfy repeated requests to the same data without accessing the shared memory 14 or using the system bus 16. Spatial locality of reference refers to the tendency of processors to access data stored at addresses near the most recently accessed data. This second phenomena results from the sequential nature of program instruction flow. In order to exploit the spatial locality of reference phenomena, cache memories 13-1 to 13-n maintain a copy of an entire data line containing at least one recently accessed data. Thus, the likelihood increases that the cache memories 13-1 to 13-n may satisfy processor requests for data not previously accessed, provided such data has an address near a previously accessed data.

The cache memories 13-1 to 13-n illustratively work as follows. Suppose a processor, e.g., the processor 11-1, issues a command to access particular data at a particular address. The processor 11-1 first attempts to access the desired data in the cache memory 13-1. The cache memory 13-1 determines if it stores a data line corresponding to the particular data accessed by processor 11-1. (Herein, a particular data line is said to "correspond" to a particular accessed data, if the data line, or its counterpart copy in the shared memory, includes at least part of the accessed data.) If so, a read or write hit (depending on whether the access instruction was a read or write) is said to occur and the data access is satisfied using the cache memory 13-1.

If the data is not present in the cache memory 13-1, a read or write miss is said to occur. In the event of a read or write miss, the cache memory 13-1 issues a read command for reading the corresponding data line from the shared memory 14. The corresponding data line is transferred from the shared memory 14 to the cache memory 13-1 via the system bus 16. Thereafter, the data access is satisfied using the duplicate copy of the data in the cache memory 13-1.

The cache memories 13-1, 13-2, ..., 13-n must operate in a manner which maintains the consistency of the data in the shared memory 14. In other words, if data in a cache memory, e.g., the cache memory 13-2, is modified, its counterpart in the shared memory 14 must invariably be modified. When a processor 11-1 to 11-n modifies data in its corresponding cache memory 13-1 to 13-n, the cache memories 13-1 to 13-n can immediately update the counterpart data in the shared memory 14. This manner of maintaining the consistency of the data is referred to as "write through".

Advantageously, to further reduce the demands on the system bus 16 and the number of shared memory 14 data accesses, the cache memories 13-1 to 13-n defer updating the stale version of the data in the shared memory 14 until a later time. This manner of maintaining the consistency of the data is referred to as "write back". For example, the cache memory may defer updating the shared memory 14 until the cache memory runs out of storage space.

As shown in FIG. 1, the computer system has one or more I/O bridges 18-1, 18-2, ..., 18-n which may access the shared memory 14. Each of the I/O bridges 18-1, 18-2, ..., 18-n may be further connected to one or more I/O devices 22, such as disk drives, Ethernet interfaces, FDDI interfaces, etc., via a corresponding I/O expansion bus 20-1, 20-2, ..., 20-n.

The purpose of the I/O bridges 18-1 to 18-n is to "decouple" or isolate the I/O expansion busses 20-1 to 20-n from the system bus 16. Typically the system bus 16 has a different data transmission protocol and speed than the I/O expansion busses 20-1 to 20-n and a different data transfer speed. For example, data may be transmitted on the system bus 16 in thirty two byte packets at a speed of 33 MHz. On the other hand, data is illustratively transferred on an I/O expansion bus, e.g., the I/O expansion bus 20-1, in four byte groups at 8 MHz.

Each I/O bridge, e.g., the I/O bridge 18-1, can receive data packets from, e.g., the shared memory 14, via the system bus 16. The I/O bridge 18-1 retrieves the data from the packets and then transfers the "depacketized" data to an I/O device 22 connected thereto via a corresponding I/O expansion bus 20-1. Conversely, each I/O bridge, i.e., the I/O bridge 18-1, can receive data from an I/O device 22 via the associated I/O expansion bus 20-1. The I/O bridge 18-1 organizes this data into packets and then transfers the data, in packets, to the shared memory 14 via the system bus 16.

Devices which access data from other devices (i.e., the processors 11-1 to 11-n, the associated cache memories 13-1 to 13-n, and the I/O bridges 18-1 to 18-n) are referred to as "masters." All masters must access data in a fashion that maintains the consistency of the data in the shared memory 14. For example, a first cache memory 13-1 might attempt to access a data line in the shared memory 14 at the same time that a second cache memory 13-2 contains a modified copy of that data line. In order to maintain the consistency of the data in the shared memory 14, the first cache memory 13-1 must obtain a copy of the data as modified by the second cache memory 13-2, not the stale counterpart copy in the shared memory 14. To that end, the masters utilize an "ownership" protocol for maintaining data consistency. According to an illustrative ownership protocol, before a master can access data, the master must successfully claim ownership in the data line corresponding to the desired data. A master which does not own a data line corresponding to particular data may not access the particular data.

When a first master desires to access particular data, the first master issues a command for claiming ownership in the corresponding data line. (This command may simply be a command to access, i.e., read from or write to a particular line address). The first master then waits a specified period to determine if its claim is successful. Each master "snoops" or monitors the system bus 16 for ownership claiming commands. If a second master currently owns, but has not modified, the data line in which the first master has claimed ownership, the second master illustratively relinquishes ownership in that data line entirely by considering that data invalid. (Alternatively, the second master relinquishes exclusive ownership of that data by considering that data line as shared and by notifying the first master that the data line must be shared with another master.) If the first master does not receive any indication that another master owns the data line during the specified period, the first master successfully claims ownership in the data line and may access the data contained therein.

If the second master detects an ownership claim to a data line which the second master has modified (but not yet written back to the shared memory 16), the second master asserts an intervention acknowledge signal(s) to the first master. This forces the first master to re-issue its ownership claiming command. Meanwhile, the second master updates the copy of the data line in the shared memory 14 by writing back the modified data line to the shared memory 14. Afterwards, the second master relinquishes ownership of that data line. The first master can then successfully claim ownership in the data line.

From the perspective of the I/O bridges 18-1 to 18-n, the ownership claiming process is more complicated. Before an I/O bridge, e.g., the I/O bridge 18-1, can receive data from an I/O device 22 via the respective I/O expansion bus 20-1, destined to particular destination addresses in the shared memory 14, the I/O bridge 18-1 must own the data line corresponding thereto. A conventional I/O bridge only attempts to claim ownership in a data line when absolutely necessary. That is, such an I/O bridge attempts to claim ownership in a data line only upon receiving a request from an I/O device 22 to transfer data corresponding to a data line not currently owned by the I/O bridge. This can unnecessarily slow down the transfer of data on the I/O expansion bus because ownership claiming commands are subject to command and bus arbitration latency on the system bus 16. Furthermore, if another master owns the data line in which the I/O bridge attempts to claim ownership, the I/O bridge must further wait until the other master relinquishes ownership of the data line.

U.S. patent application Ser. No. 08/071,721 entitled "Memory Consistent Pre-Ownership Method and System for Transferring Data Between an I/O Device and a Main Memory" provides a novel solution to this problem. According to this incorporated application, when an I/O device 22 transmits a command to write data into the shared memory 14, the I/O bridge 18-1 issues a command for claiming ownership in this data line as before. However, the I/O bridge 18-1 can also issue a second command for claiming ownership in the very next data line, i.e., having the immediately following or immediately preceding line address, even while receiving data corresponding to a currently owned data line. Stated another way, the I/O bridge 18-1 can preliminarily attempt to claim ownership in a sequence of one or more of the very next data lines before the I/O device 22 indicates that it intends to transfer data corresponding thereto. This is possible because of the predictable, sequential nature of I/O device data access to the shared memory 14. That is, an I/O device 22 typically transfers a block of data (e.g., 1 to 4 k bytes) to sequentially ascending or descending addresses of the shared memory 14. The I/O bridge 18-1 can easily determine (from the first group of consecutive data transfer commands issued by the I/O device 22) whether the data block is to be transferred into sequentially ascending or descending address. Thus, the I/O bridge 18-1 can accordingly "pre-issue" "pre-ownership" claims in the immediately sequentially following or preceding data lines.

The computer system 10 is designed to maximize the throughput, i.e., the flow of data from input to output. This is achieved partly by increasing the processing speed of the processors 11-1 to 11-n. However, the most significant increase in speed lies in the manner of operating and allocating shared resources, such as the shared memory 14 and the system bus 16, to the devices, i.e., processors 11-1 to 11-n, cache memories 13-1 to 13-n, I/O bridges 18-1 to 18-n, etc. For instance, while many of theses devices can process data independently, the system bus 16 is the only means for transferring data between these independently operating devices. Thus, the computer system 10 is designed to operate and allocate the system bus 16 in a fair and orderly manner which increases throughput.

As discussed above, one purpose of the cache memories 13-1 to 13-n is to ensure that the processors 11-1 to 11-n are not idly waiting for data accesses to be satisfied by the slow shared memory 14 (which shared memory 14 operates at a fraction of the speed of the processors 11-1 to 11-n, e.g., 1/10 to 1/20 of the processors' 11-1 to 11-n speed). However, the cache memories 13-1 to 13-n also reduce the number of data transfers on the system bus 16, thereby decreasing the demands to access the bus 16.

The transfer of data and commands on the system bus 16 may be further optimized depending on how both data and commands are transferred on the system bus. FIG. 2 illustrates a timing diagram explaining two data and command transfer methods on the system bus 16 of FIG. 1. The signal "A" illustrates a first manner of transferring data on the system bus 16 called "simple bus". As shown, a master issues a read data command on the system bus 16 at time $A_1$ destined to the shared memory 14. The master then monitors the system bus 16 for the data returned by the shared memory 14. At a time $A_2$, the shared memory 14 transmits the requested data to the master. In order to prevent confusion of source and destination devices for each transferred data, no device may transmit during the period between the times $A_1$ and $A_2$. Rather, the system bus 16 is idle during this time.

This manner of transferring data and commands on the system bus 16 is disadvantageous. This is because the system bus 16 is idle for substantial time periods between the issuance of read commands and the transfer of data from the shared memory 14.

Signals "B1" and "B2" illustrate another transfer scheme on a split transaction system bus 16 which supports split read transactions. With such a bus, data read from the shared memory 14 may be transferred back to the requesting master via the data bus 16-1 independently of the transfer of commands on the command bus 16-2. For example, signal B1 shows the issuance of a number of split read transaction type read commands CMD1, CMD2, CMD3 on the command bus 16-2. Signal B2 shows the transfer of data DATA1, DATA2, DATA3 on the data bus 16-1 corresponding to the issued split read transactions type read commands CMD1, CMD2, CMD3, respectively. As can be seen, the issuance of read commands is no longer delayed by the return of data corresponding to each issued read command.

In the computer system 10 (FIG. 1), masters are permitted to simultaneously have more than one outstanding, unsatisfied read command for which the shared memory 14 has not yet returned the accessed data. For example, an I/O bridge 18-1 which issues pre-ownership claims as discussed above may issue a number of ownership claiming read commands (i.e., CMD1, CMD2) in consecutive cycles regardless of whether the shared memory 14 has returned data corresponding to any previously issued read commands.

Signal B2 shows the data being returned in the order in which the ownership claiming instructions were issued. Thus, if the I/O bridge 18-1 issued commands CMD1 and CMD2, the first returned data DATA1 would correspond to CMD1 and the second returned data DATA2 would correspond to CMD2. However, this is not always the case in actual operation. Generally, the order of returned data is arbitrary, depending on, among other things, the write back policy obeyed by the masters of the computer system 10. Consider the example where the I/O bridge 18-1 issues CMD1 and CMD2 on consecutive cycles to read two different data lines DATA1 and DATA2, respectively. However, the cache memory 13-1 currently owns, has modified, but has not yet updated, the data line DATA1. In such a case, the cache memory 13-1 illustratively detects CMD1 on the command bus 16-2 and asserts an intervention acknowledge signal. In the meantime, the shared memory 14 retrieves the second data line DATA2 and transfers this data to the I/O bridge 18-1. Subsequently, the cache memory 13-1 writes back the data line DATA1 which is received at the I/O bridge 18-1.

This presents a problem for the masters of the computer system 10 because a master with more than one outstanding read command cannot predict with certainty the order of the returned data. Stated more generally, each master, which can have a number of outstanding, unsatisfied requests to utilize a shared resource of the computer system 10 (FIG. 1), must be able to correlate each utilization or satisfaction with its corresponding request. This is particularly a problem when the requests are satisfied in an arbitrary order. An object of the present invention is to overcome this disadvantage.

SUMMARY OF THE INVENTION

This and other objects are achieved by the present invention which provides a labelling method and system for identifying the satisfaction of requests to utilize a shared resource. In a particular illustrative embodiment, the shared resource is the shared memory of a computer system and the requests to utilize the shared resource are commands to read data from the shared memory. The masters in this case are illustratively, I/O bridges, processors and cache memories. Such devices may have a number of outstanding, unsatisfied read commands pending at one time. When such a master issues a read command to the shared memory via the system bus, a label which is unique over all pending, unsatisfied read requests is assigned to the read command. According to one embodiment, when the shared memory satisfies the read command by returning the requested data, the shared memory also transmits the label assigned to the corresponding read command via the system bus. The master detects this label and can use the label to correlate the data transmitted from the shared memory to the outstanding read command issued therefrom.

According to one embodiment, a master is provided with a labelling circuit for labelling outstanding requests to utilize a shared resource. The labelling circuit has a first memory for storing an assigned indication corresponding to each label assigned by each master of the computer system. The memory indicates a label available for assignment which label is unique over each outstanding request of each master of the computer system. The labelling circuit also has a first circuit which is responsive to the unique label indicated by the memory. The first circuit is provided for assigning the unique label indicated by the first memory to a request issued by the master to utilize the shared resource.

The first circuit also illustratively detects successful requests issued by other masters. In response to detecting each of such requests, the first circuit stores an assigned indication in the first memory corresponding to the unique label indicated by the first memory at the time of detecting such a successful request.

Illustratively, the labelling circuit has a second memory for storing an assigned indication corresponding to each label assigned to a request issued only by the particular master containing the labelling circuit. That is, each time the first circuit assigns a label to a request issued by the particular master containing the labelling circuit, the first circuit stores a corresponding assigned indication in the second memory.

Illustratively, the labels are ordered. In such a case, each indication stored in the first memory may illustratively be inputted to a priority encoder which selects as the unique label, the lowest ordinal label for which the first memory does not store an assignment indication.

Illustratively, the shared resource transmits the label assigned to each request as the request is satisfied. The labelling circuit may illustratively be provided with a second circuit for, as each outstanding request is satisfied, receiving each label corresponding to a satisfied request and for clearing the indications stored in the first and second memories corresponding to each of the received labels. In this fashion, the second circuit makes the label initially assigned to each satisfied request available for re-assignment.

The labelling circuit also illustratively has a third circuit receiving, in parallel, each indication stored in the second memory. The third circuit is provided for comparing the label received from the shared memory with the indications stored in the second memory. The third circuit outputs an indication which indicates that a request of the particular master is satisfied if a label is received which was initially assigned by the particular master.

As mentioned above, the shared resource may be the shared memory and the requests may be read commands. In such a case, the labelling circuit illustratively includes a RAM for storing an address contained in each read command issued by the master containing the labelling circuit. The address of the read command is stored in the RAM at a location corresponding to the label assigned to the read command. The shared memory subsequently satisfies the read command by returning the label assigned to the read command followed by the data requested by the read command. When the label is received from the shared memory, the address can be easily retrieved from the RAM. The returned data can then be stored in another memory of the master at the retrieved address.

In short, a labelling method and system are disclosed for correlating each request to utilize a shared resource with its corresponding satisfaction. The labelling method and system enables masters to correlate received satisfactions of requests with their corresponding requests regardless of the order in which requests are satisfied. Thus, masters according to the present invention may have more than one outstanding, unsatisfied request pending at the same time wherein the requests are satisfied in an arbitrary order.

DETAILED DESCRIPTION OF THE INVENTION

Figure 3:
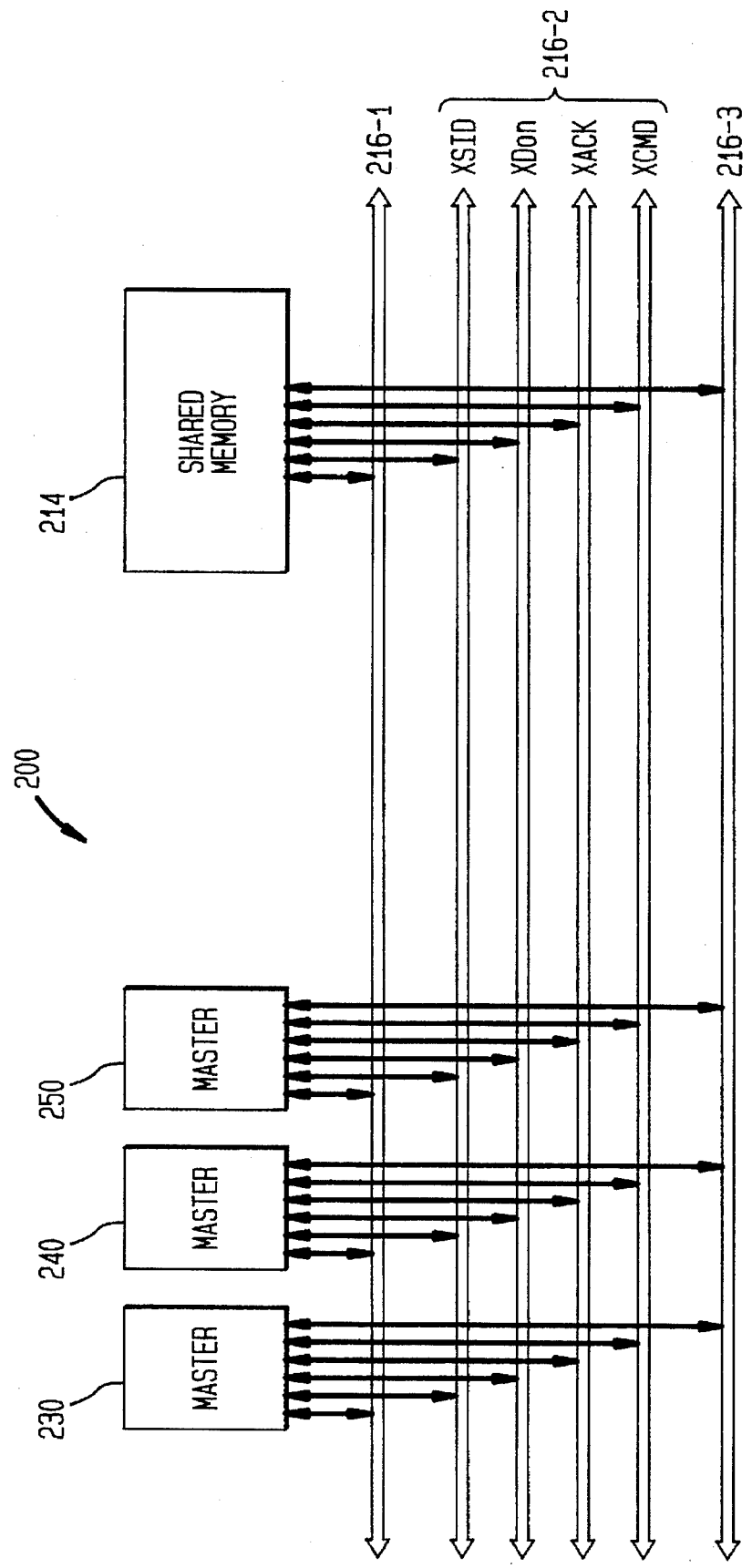
FIG. 3 shows a computer system according to the present invention.

FIG. 3 shows a computer system 200 according to one embodiment of the present invention. The computer system 200 is shown with masters 230, 240, and 250, and a shared memory 214 connected to a system bus 216. The masters 230, 240, and 250 may for example be processors, cache memories, I/O bridges, etc. As shown, the system bus 216 comprises a data bus 216-1, a command bus 216-2 and an arbitration bus 216-3. The command bus illustratively includes the signal path XCMD for transmitting commands. The command bus 216-2 illustratively also includes the signal paths XACK, XSID and XDon for carrying the signals ACK, SID and Don. The purpose of these signals is discussed below.

Figure 1:
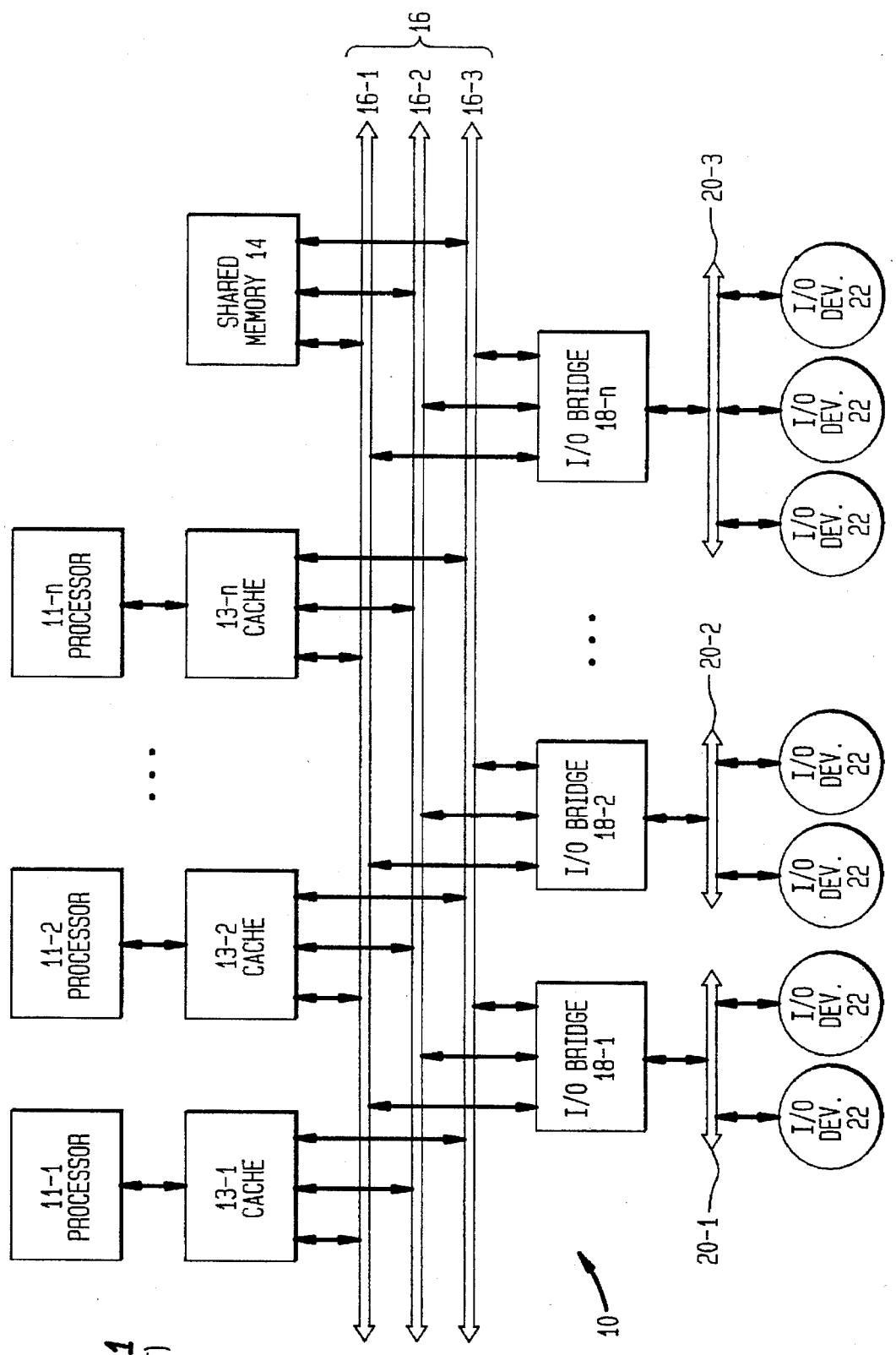
FIG. 1 shows a conventional computer system.
Figure 2:
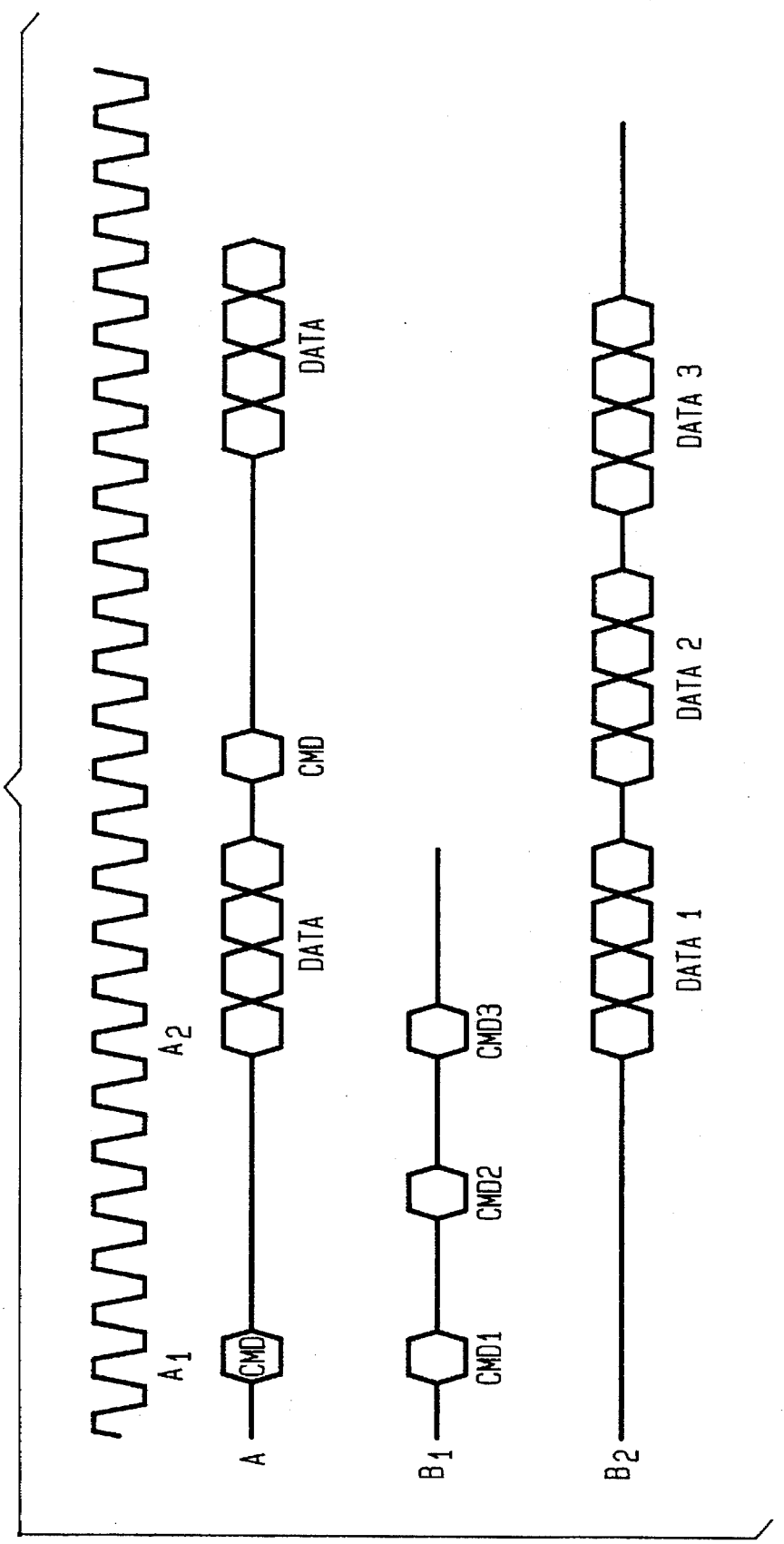
FIG. 2 is a timing diagram illustrating ordinary read transactions on a system bus and split read transactions on a split transaction system bus.
Figure 4:
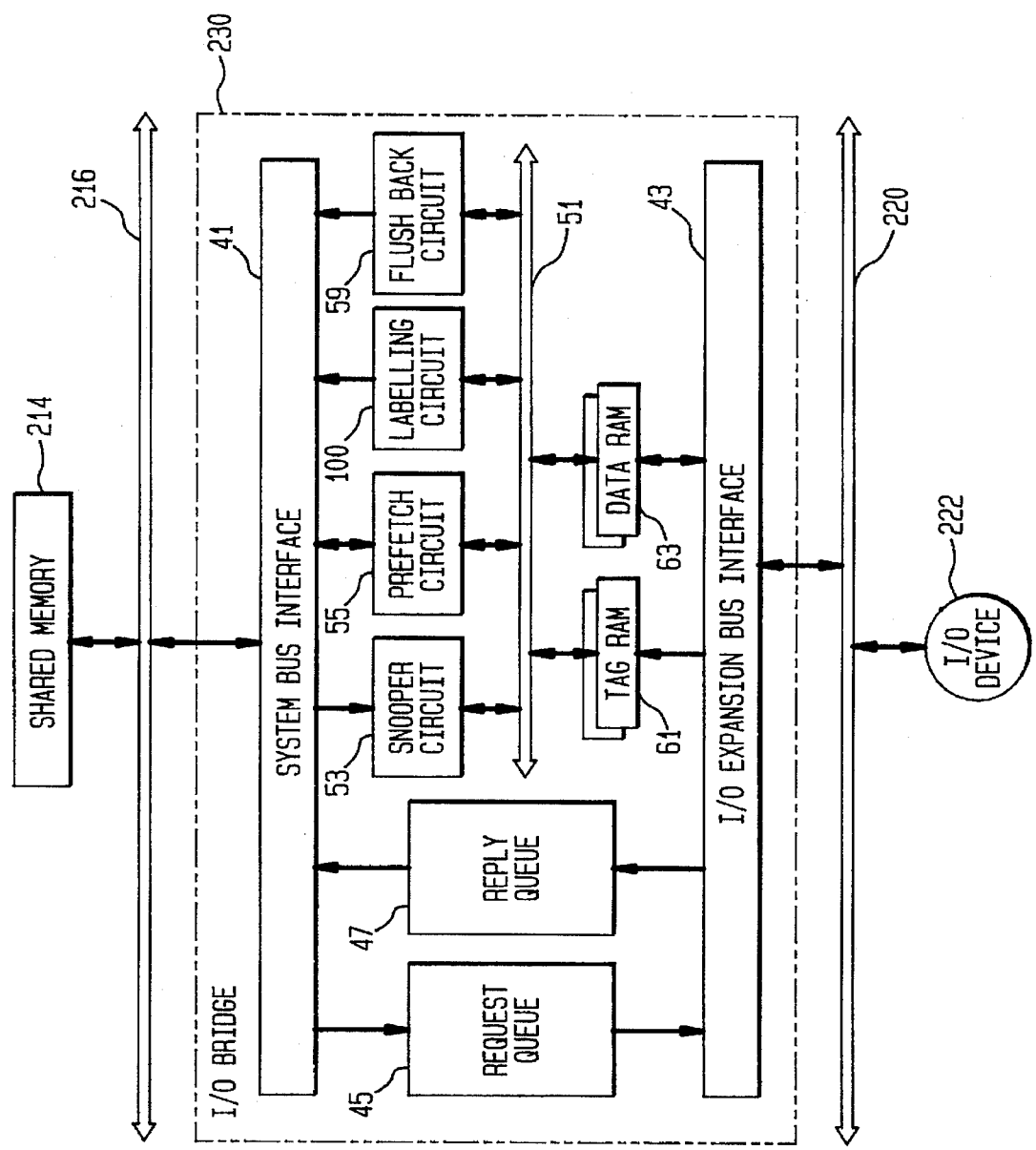
FIG. 4 shows an I/O bridge according to one embodiment of the present invention.

FIG. 4 shows an illustrative master 230 in the form of an I/O bridge. Illustratively, the I/O bridge 230 is a sophisticated I/O bridge capable of pre-issuing pre-ownership claims such as described in U.S. patent application Ser. No. 08/071,721. The I/O bridge 230 has a system bus interface 41 connected to the system bus 216. The I/O bridge 230 also has an I/O expansion bus interface 43 connected to a corresponding I/O expansion bus 220. The interfaces 41 and 43, among other things, multiplex data, commands and other control signals into a form suitable for transmission on the corresponding bus 216 or 220 connected thereto, and demultiplex data, commands and other control signals from the corresponding bus 216 or 220. A request queue 45 and a reply queue 47 are connected between the system bus interface 41 and the I/O expansion bus interface 43. The request and reply queues 45 and 47 buffer commands transmitted from another master, e.g. 240 or 250 of FIG. 1, down to the I/O device 222 connected to the I/O bridge 230.

The I/O bridge 230 illustratively also has an internal bus 51 for local communication of data and command signals between a snooper circuit 53, a pre-fetch circuit 55, a flush back circuit 59, a tag RAM 61, a data RAM 63 and a labelling circuit 100. The operation of the I/O bridge 230 is now explained.

Suppose the I/O device 222 has a block of data words to be read from particular sequential addresses in the shared memory 214. In such a case, the I/O device 222 transmits, via the I/O expansion bus 220, a sequence of data transfer (read) commands. These commands or requests contain the shared memory destination addresses from which the data words are to be read. The requests are sequentially received in the pre-fetch circuit 55. For each received request, the pre-fetch circuit 55 first checks the tag RAM 61 to determine if the I/O bridge 230 already owns a valid copy of the data line corresponding to the data which the I/O device 222 desires to transfer. Illustratively, the tag RAM 61 stores the line address and a corresponding valid indication signal for each data line pre-fetched by the I/O bridge 230.

If the tag RAM 61 stores a valid indication signal for the data line, the pre-fetch circuit 55 then allows the I/O device 222 to read the requested data from the I/O bridge 230 (FIG 4).

If the tag RAM 61 does not store a valid indication for the data line corresponding to the data to be read, then the I/O bridge 230 has not yet successfully pre-fetched the corresponding data line. In such a case, the pre-fetch circuit 55 issues commands to read the corresponding data line. It also issues commands to read a sequence of one or more of the immediately preceding or succeeding data line, depending on whether the data is to be transferred to ascending or descending destination addresses in the shared memory 214.

The pre-fetch circuit 55 (FIG. 4) inputs to the labelling circuit 100, the data line storage location of each read command in the data RAM 63. This data line storage location is allocated for receiving the corresponding data from the shared memory 214.

The labelling circuit 100 labels (as discussed below) each read command so that the data returned from the shared memory 214 can be properly correlated with the issued read commands. If the I/O bridge 230 successfully reads back a data line, the labelling circuit 100 provides a data line storage location address to both tag RAM 61 and data RAM 63. By using that data line storage location address, the tag RAM 61 stores the line address of that read back data line. The tag RAM 61 also stores a valid indication signal that the data line is pre-fetched. Furthermore, by using the data line storage location address, the data RAM 63 stores the read back data.

The snooper circuit 53 monitors the system bus 216 for ownership claiming commands issued by the other masters 240 and 250. If the snooper circuit 53 detects an ownership claim for a data line pre-fetched by the I/O bridge 230, the snooper circuit 53 relinquishes ownership in the data line by invalidating the valid indication stored for that data line in the tag RAM 61. Thus, at a later time, the pre-fetch circuit 55 may re-read that data line to get ownership of the data corresponding thereto.

Figure 5:
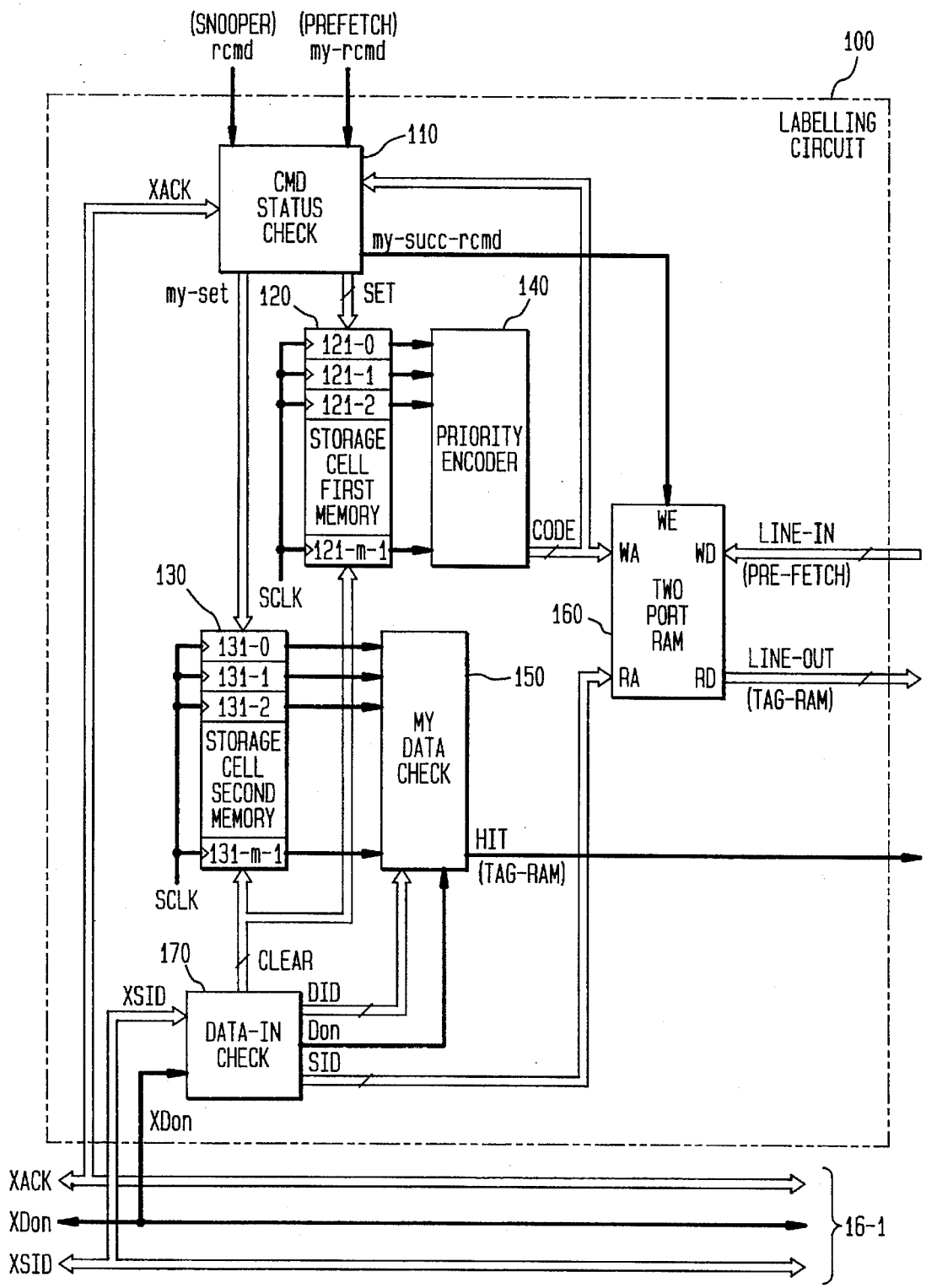
FIG. 5 shows the labelling circuit of FIG. 4 in greater detail.

Referring to FIG. 5, the labelling circuit 100 is now discussed in greater detail. As shown, the labelling circuit 100 has a command status check circuit 110 which receives the signal XACK from the command bus 216-2. The command status check circuit 110 also receives a signal my-rcmd (e.g., from the pre-fetch circuit 55) if the master 230 issues a read command. Furthermore, the command status check circuit 110 receives a signal rcmd (e.g., from the snooper circuit 53) if any other master 240, 250 transmits a read command on the command bus 216-2.

The purpose of the command status circuit 110 is to keep track of all labels assigned by masters 230, 240 and 250. The command status check circuit 110 monitors the XACK signal on the command bus 216-2 to determine if the master 230, or any other master 240 or 250, successfully issues a read command. Illustratively, the shared memory 214 transmits an appropriate indication in the XACK signal for acknowledging the receipt of a read command. If the master 230 successfully issues a read command, the command status check circuit 110 outputs a my-set signal indicating the label assigned to that read command of the master 230. If any master 230, 240 or 250 connected to the system bus 216 successfully issues a read command, the command status check circuit 110 outputs a set signal indicating the label assigned to the successful read command by the master 230, 240 or 250.

The set signal is received at a first memory 120 which stores an "assigned" indication for each label indicated in the set signal. Likewise, the my-set signal is received at a second memory 130 which stores an "assigned" indication for each label indicated in the my-set signal. The first and second memories 120 and 130 each have m storage cells 121-0, 121-1, ..., 121-m-1 or 131-0, 131-1, ..., 131-m-1. Illustratively, there are m total possibly assignable labels. The first memory 120 includes one storage cell 121-0, ..., 121-m-1 corresponding to each possible label that may be assigned to an outstanding read command. Likewise, the second memory 130 includes one storage cell 131-0, ..., 131-m-1 corresponding to each possible label that may be assigned to an outstanding read command. The first memory 120 is for storing an assigned indication (e.g., a logic '1') for each label assigned by any master 230, 240 or 250 connected to the system bus 216. The second memory is for storing an assigned indication (e.g., a logic '1') for each label assigned by the master 230 only.

The first memory 120 outputs, in parallel, each indication stored therein to a priority encoder circuit 140. In response, the priority encoder circuit 140 outputs a code signal to the command status check circuit 110. The code signal indicates a unique label available for assignment, which label is not yet assigned by any master 230, 240 or 250 connected to the system bus 216. Illustratively, the priority encoder 140 always outputs the lowest ordinal label which has not yet been assigned by any master 230, 240, or 250 connected to the system bus 216. For example, suppose there are m=eight labels numbered from logic '000' to logic '111'. (For sake of economy, the label is referred to by its number herein. For example, the label numbered '000' is referred to as the label '000'.) Table 1 summarizes the code signal outputted by the priority encoder depending on the corresponding indications outputted by the first memory 120.

TABLE 1

| 121-0 | 121-1 | 121-2 | 121-3 | 121-4 | 121-5 | 121-6 | 121-7 | Code |
|---|---|---|---|---|---|---|---|---|
| 0 | X | X | X | X | X | X | X | 000 |
| 1 | 0 | X | X | X | X | X | X | 001 |
| 1 | 1 | 0 | X | X | X | X | X | 010 |
| 1 | 1 | 1 | 0 | X | X | X | X | 011 |
| 1 | 1 | 1 | 1 | 0 | X | X | X | 100 |
| 1 | 1 | 1 | 1 | 1 | 0 | X | X | 101 |
| 1 | 1 | 1 | 1 | 1 | 1 | 0 | X | 110 |
| 1 | 1 | 1 | 1 | 1 | 1 | 1 | 0 | 111 |

In Table 1, the indications stored in the cells 121-0 to 121-7 of the first memory 120 for the labels '000', '001', '010', '011', '100', '101', '110', '111' are shown in respectively designated columns. A logic '1' indicates that the label is assigned, a logic '0' indicates that the label is not assigned, i.e., available, and 'X' means "don't care". As shown, the priority encoder 140 always outputs a code signal indicating the lowest ordinal label for which the first memory 120 does not store an assigned indication.

Illustratively, prior to transferring the data of a read command via the data bus 216-1 (FIG. 3), the shared memory 214 transmits the XSID and XDon signals on the command bus 216-2. The shared memory 214 keeps track of which labels belong to which returned data by either latching the ID of the requester while the read command is transferring if there is an ID transferred in combination with the read command, or latching the ID of the requester at the end of the arbitration phase of that command.

A data-in check circuit 170 is provided which receives the signal XSID and the signal XDon from shared memory 214 via the command bus 216-2. The signal XSID indicates the label associated with the data returned from the shared memory 214 via the data bus 216-1. The XDon signal indicates whether or not a valid label is being transmitted in the XSID signal. When the XDon signal is activated, the data-in detect circuit 170 outputs a clear signal to the first and second memories 120 and 130 for clearing an assignment indication stored for the label indicated by the signal XSID. Contemporaneously, the data-in detect circuit 170 outputs the signal Don, the signal SID and the signal DID which is the n to m decoded version of SID, where DID is an m bit signal and where m=$2^n$=the number of possibly assignable labels.

A my-data check circuit 150 is provided which receives the signals Don, and DID. In addition, the second memory 130 outputs, in parallel, each indication stored therein to the my-data check circuit 150. The my-data check circuit 150 compares the DID signal to the outputted indications of the second memory 130 when the Don signal is activated. In response to this comparison, the my-data check circuit 150 outputs a signal called Hit (e.g., to the tag RAM 61). The Hit signal indicates whether or not the shared memory 214 returns data belonging to the master 230.

The labelling circuit 100 also has a two-port RAM 160 having two address ports referred to as WA and RA, and two data ports referred to as WD and RD. The two port RAM 160 receives the code signal at the address port WA and the SID signal at the address port RA. In addition, the two port RAM 160 receives a line address at the data port WD (e.g., from the pre-fetch circuit 55) and outputs a line address from the data port RD (e.g., to the tag RAM 61). The command status check circuit 110 outputs a signal my-succ-rcmd to the write enable ("WE") port of the two port RAM 160. The my-succ-rcmd signal indicates whether or not the master 230 (FIGS. 3 and 4), successfully issues a read command.

The purpose of the two port memory 160 is to store the line addresses of each data line for which the master, i.e., the I/O bridge 230 (FIGS. 3 and 4), has an outstanding read request. The line addresses are stored in a manner such that they can easily be retrieved and correlated with returned data using the label corresponding thereto. A two port memory is used rather than a single port memory because the master 230 may issue a read command at the same time the shared memory 214 returns data to the master 230. Thus, the two port memory 160 can simultaneously store a line address for a recently issued read command and retrieve a line address corresponding to recently received data.

Figure 6A:
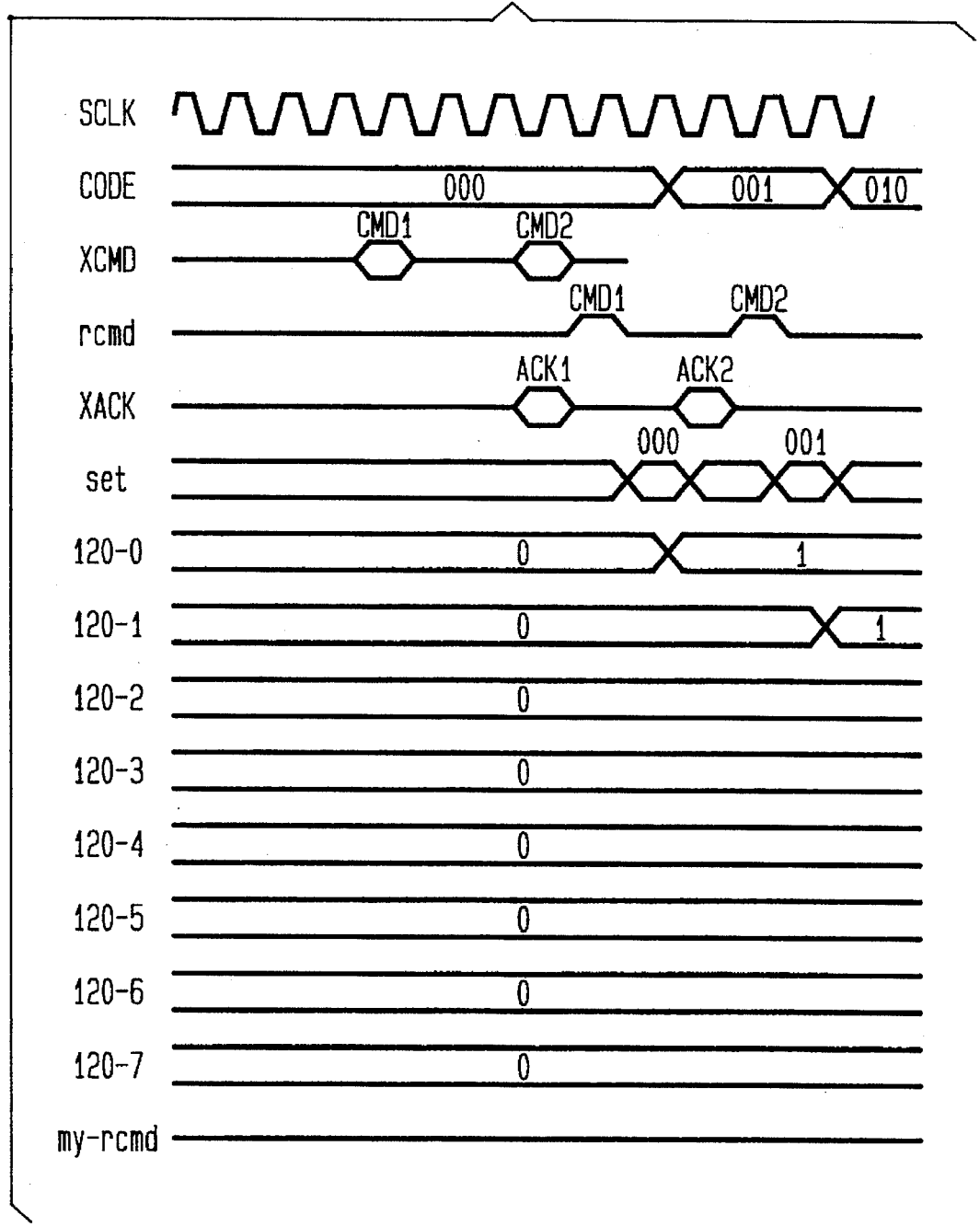
FIGS. 6(a)–(b) are timing diagrams illustrating the operation of the labeling circuit of FIG. 5.

The operation of the labelling circuit 100 is now explained with reference to FIGS. 4, 5 and 6(a). Suppose that up to m=eight labels can be assigned at one time to outstanding read requests of all masters 230, 240 and 250 connected to the system bus 216. Both the first and second memories 120 and 130 therefore have eight storage cells 121-0 to 121-7 and 131-0 to 131-7 for storing eight indications. Initially, each storage cell 121-0 to 12-7 and 131-0 to 131-7 stores an "available" indication, i.e., a logic '0'. Thus, the first memory 120 outputs eight logic '0' in parallel to the priority encoder 140. As shown in FIG. 6(a), the priority encoder 140 therefore outputs logic '000' as the code signal to the WA port of the two port RAM 160 and the command status check circuit 110.

Suppose, as shown in FIG. 6(a), a master 240 other than the master 230 in which the labelling circuit 100 is located issues a read command CMD1 in the XCMD signal on the command bus 216-2 (FIG 3). If the read CMD1 is successfully received at the shared memory 214, the shared memory 214 transmits an acknowledgement ACK1 in the XACK signal on the system bus 216. This acknowledgement ACK1 is illustratively detected by a snooper circuit 53 of the master 230. As a result, the snooper circuit 53 outputs a rcmd signal to the command status check circuit 110 indicating that another master 240 successfully issued a read command, as shown in FIG. 6(a). The command status check circuit 110 also monitors the XACK signal for acknowledgement ACK1 of the receipt of the read command (which acknowledgement is illustratively transmitted by the shared memory 214 (FIG. 3). If an acknowledgement and a rcmd signal are received as shown in FIG. 6(a), the command status check circuit 110 transmits a set signal for storing an assignment indication in the storage cell 121-0 associated with the label '000' indicated by the code signal. (Because no labels are initially assigned, the code signal indicates the label '000'.) This is depicted in FIG. 6(a) by the label '000' in the set signal.

Illustratively, the set signal is transmitted via m signal lines (in this case m=eight) including one signal line corresponding to each label. Each of the m set signal lines of the set signal is connected to a set input of a corresponding storage cell 121-0 to 121-m-1 of the first memory 120 associated with the same label as the set signal line. The command status check circuit 110 can then simply transmit a logic '1' on the set signal line connected to the storage cell 121-0 to 121-m-1 corresponding to the same label indicated by the code signal.

The indications stored in the first memory are again outputted in parallel to the priority encoder 140. This time, however, the storage cell 121-0 corresponding to the label '000' stores an assigned indication (i.e., a logic '1'). Thus, a logic '1' is outputted from the storage cell 121-0 and a logic '0' is outputted from each other storage cell 121-1 to 121-7. As such, the priority encoder outputs a code signal indicating that the label '001' is available for assignment (see Table 1). This is shown in FIG. 6(a).

Suppose that subsequently, the status command check circuit 110 detects appropriate rcmd and XACK signals indicating that a master 250 other than the master 230 containing the labelling circuit 100 successfully issued another read command CMD2, as shown in FIG. 6(a). In this case, the command status check circuit 110 outputs a set signal for setting the storage cell 121-1 associated with the next label indicated by the code signal, i.e., '001'. To that end, the command status check circuit 110 outputs a logic '1' on the signal line connected to the storage cell 121-1 associated with the label '001'.

Figure 6B:
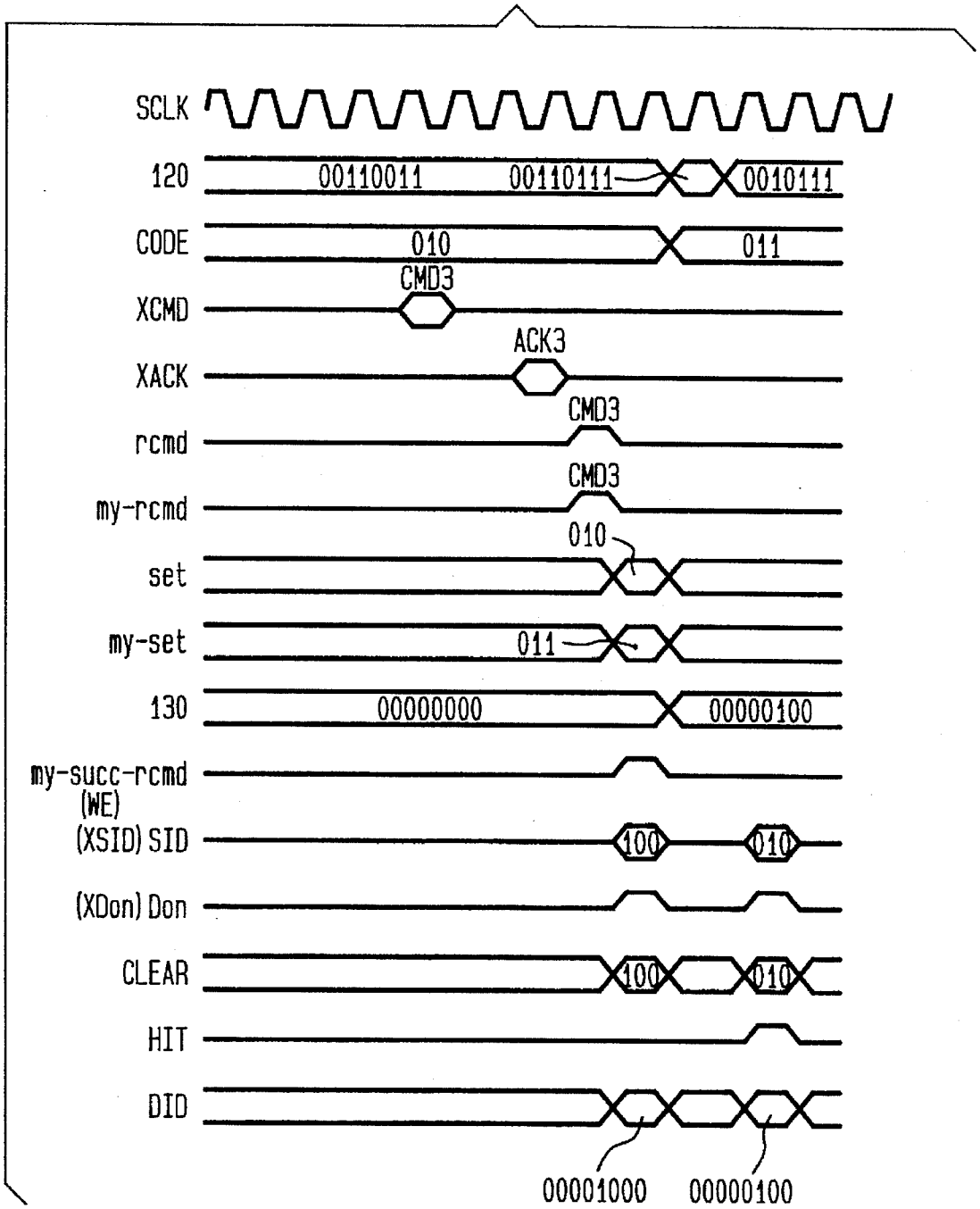

Consider now the case where the labels '000', '001', '100' and '101' are assigned to other masters 240 and 250 such as shown in FIG. 6(b). As such, the first memory 120, stores an assigned indication in each storage cell 121-0, 121-1, 121-4 and 121-5 corresponding to the labels '000', '001', '100' and '101'. This is depicted in FIG. 6(b) by the signal "120" having a value '00110011' which value is simply the indications stored in the storage cells in the order 121-7, 121-6, . . . , 121-0. As shown in FIG. 6(b), the priority encoder 140 receives each indication stored in the first memory 120 in parallel and outputs a code signal indicating that the label '010' is available for assignment as indicated by Table 1.

Suppose the master 230 containing the label circuit 100, successfully issues a read command CMD3 which is acknowledged by the indication ACK3 in the XACK signal. In such a case, the command status check circuit 110 receives an indication of this event in the rcmd signal transmitted from the snooper circuit 53 as before. In addition, the command status check circuit 110 receives a my-rcmd signal indicating that the master 230 containing the labelling circuit 100 has successfully issued a read command. (This signal is illustratively transmitted to the command status check circuit 110 by a pre-fetch circuit 55 such as shown in FIG 4.) The command status check circuit 110 also receives the indication ACK3 in the XACK signal that the read command was received (at the shared memory 214). In response, the command status check circuit 110 transmits a set signal for storing an assigned indication in the storage cell 121-2 of the first memory 120 corresponding to the unique label available for assignment '010' indicated by the code signal. Furthermore, the command status check circuit 110 transmits a my-set signal for storing an assigned indication in the storage cell 131-2 of the second memory 130 associated with the unique label '010' indicated by the code signal. Illustratively, the my-set signal is transmitted via m signal lines including one my-set signal line corresponding to each label. Each of the m my-set signal lines is connected to a set input of a corresponding storage cell 131-0 to 131-m-1 of the second memory 130 associated with the same label as the my-set signal line. Thus, the command status check circuit 110 can simply transmit a logic '1' via the my-set signal line connected to the storage cell 131-2 corresponding to the label '010'.

In addition to generating appropriate set and my-set signals, the command status check circuit 110 generates a my-succ-rcmd signal if the master 230 containing the labelling circuit 100 successfully issues a read command signal. This signal is received at the WE terminal of the two port RAM 160. At the same time, the two port RAM 160 receives the code signal at the address port WA and the line address of the data line read by the master 230 at the data port WD. Illustratively, the line address is transmitted from the pre-fetch circuit 55. Because the my-succ-rcmd signal enables the storage of data in the two port RAM 160, the line address is stored in a storage location of the two port RAM 160 corresponding to the label assigned to the master 230.

Suppose thereafter, data corresponding to the read command assigned the label '100' is returned via the data bus 216-1 from the shared memory 214 (FIG. 3). On the cycle of the system bus 216 prior to returning the data, the shared memory 214 transmits the XSID signal indicating the label of the returned data and the XDon signal indicating that a valid label is being returned, as shown in FIG. 6(b). The XSID and XDon signals are received at the data-in check circuit 170. In response, the data-in check circuit 170 outputs a clear signal for clearing the assignment indication stored in the storage cells 121-4 and 131-4 of the first and second memories 120 and 130 corresponding to the label indicated by the XSID signal. Illustratively, the clear signal is transmitted via m signal lines including one signal line corresponding to each label. Each clear signal line is connected to the clear input of a corresponding storage cell 121-0 to 121-m-1 and a corresponding storage cell 131-0 to 131-m-1 of the first and second memories 120 and 130 associated with the same label as the clear signal line. The data-in check circuit 170 transmits a logic '1' on the clear signal line corresponding to the label indicated by the XSID signal. This, in turn, clears the indication stored in the particular storage cells 121-0 to 121-m-1 of the first memory 120 and 131-0 to 131-m-1 of the second memory 130 associated with the label indicated by the SID signal. By clearing the indication of the appropriate storage cells 121-0 to 121-m-1 and 131-0 to 131-m-1, the received label is made available for re-assignment by each master 230, 240 or 250 of the computer system 210.

As a result of clearing the indication associated with the label '100' in the first memory 120, the first memory 120 only stores an assigned indication for the labels '000', '001', '010' and '101'. This is shown in FIG. 6(b). The indications are inputted in parallel to the priority encoder 140 which outputs a code signal indicating that the label is '011' is available for assignment.

In addition, the data-in check circuit 170 outputs the Don and DID signals to the my-data check circuit 150. As mentioned above, the DID signal is the n to m decoded signal of the SID signal, where $2^n=m=$the number of different possibly assignable labels. In this case, the SID signal has n=3 binary digits for conveying m=8 different labels. Thus, the DID signal is a 3 to 8 decoded version of the SID signal. The DID signal is illustratively transmitted via m signal lines including one signal line corresponding to each label. The my-data check circuit 150 compares the signal transmitted on each DID signal line with a corresponding indication received from the second memory 130 which indication and signal line correspond to the same label. If a label is received which was assigned by the master 230, then both the DID signal line corresponding to the received label and the indication stored in the storage cell compared thereto will be a logic '1'. In such a case, an indication, e.g., a logic '1', is transmitted in the Hit signal indicating that data belonging to the master 230 was received. In the present example, this is not the case, so no such indication is generated.

Suppose that the shared memory 214 has data to return to the master 230 corresponding to the read command assigned the label '010'. Prior to transmitting the data, the shared memory 214 transmits a XSID signal indicating the label '010' and the XDon signal as shown in FIG. 6(b). These signals are received at the data-in check circuit 170 which transmits an appropriate clear signal for clearing the assigned indications in the storage cells 121-2 and 131-2 of the first and second memories 120 and 130.

In addition, the data-in check circuit 170 outputs the Don and DID signals to the my-data check circuit 150. In this case, both the indication outputted by the storage cell 131-2 and the DID signal corresponding to the label '010' are a logic '1'. As such, the my-data check circuit 150 outputs an indication (e.g., a logic '1') in the Hit signal that data corresponding to an outstanding read command (of the master 230 containing the labelling circuit 100) was received as shown in FIG. 6(b). Illustratively, the Hit signal is received at the chip enable terminal of the integrated circuits that form the tag RAM 61.

The data-in check circuit 170 also outputs the signal SID to the RA port of the two-port RAM 160. This causes the two port RAM 160 to output at the port RD the line address corresponding to the label indicated by the SID signal. If the label does not belong to the master 230, then the value outputted at the port RD should not be used. To that end, the master 230 uses the Hit signal as a qualifier to determine if the outputted line address is valid. If the data is associated with the master 230, the Hit signal illustratively enables the storage of the data on the data bus 216-1 in a memory of the master 230. Alternatively, as in the present example, the read data is not necessary. As such, the tag RAM 63 simply stores the line address outputted from the two port RAM 160, and a pre-fetch indication in response to an appropriate indication in the Hit signal. Otherwise, if the Hit signal does not contain such an indication, the tag RAM 63 is disabled and the line address outputted from the port RD is not stored therein.

The labels assigned by the labelling circuit 100 are highly predictable. That is, if the first memory 120 stores an assigned indication for a given set of labels, one can predict the unique label selected by the priority encoder 140. This is advantageous because several masters may have a labelling circuit 100 for labelling read commands. Thus, the labelling circuit 100 in each master 230, 240, and/or 250 assigns the identical label for each sequentially issued read command regardless of from which master 230, 240, and 250 the read command issued.

The command status check circuit 110, first and second memories 120, 130, priority encoder 140, my-data check circuit 150 and data-in check circuit 150 can each be formed by intelligent digital finite state machines. Priority encoders 140 are well known in the art. An appropriate encoder may be constructed for any number m of storage cells.

Figure 7:
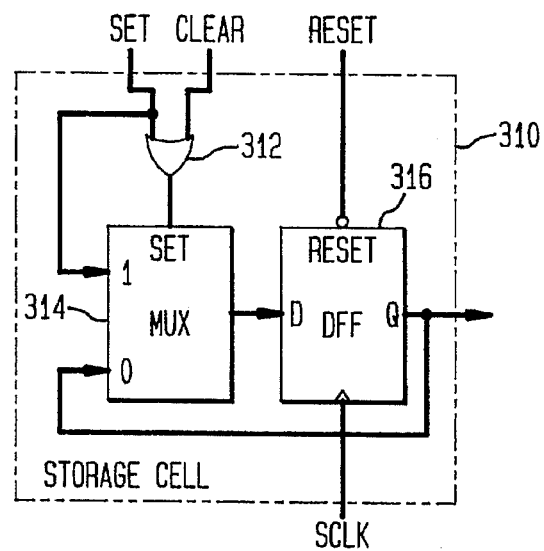
FIG. 7 shows an illustrative storage cell in the first or second memory of FIG. 5.

FIG. 7 shows an illustrative storage cell 310 used in the first and second memories 120 and 130 (FIG. 5). Each storage cell 310 has an OR gate 312 which receives corresponding set (from the command status check circuit 110) and clear (from the data-in check circuit 170) signals for setting and clearing an indication stored in that particular cell 310. The OR gate 312 outputs a value to the select control input of a multiplexer 314. The multiplexer 314 receives the output of a flip-flop 316 as one selectable input numbered 0 and the set signal as another selectable input numbered 1. The value selected by the multiplexer 314 is inputted to the data input of the flip-flop 316. The flip-flop 316 receives the system clock SCLK as a clock input. The output Q of the flip-flop 316 serves as the output of the storage cell. The flip-flop 316 also has an asynchronous reset terminal for resetting the flip-flop 316 to zero, for example during power on self-test.

When both the set and clear signals are a logic '0', the multiplexer 314 selects the input labelled 0. This causes the flip-flop 316 to retain its original value. Thus, if no indication for setting or clearing an assignment indication is transmitted to the storage cell 310, the indication outputted by the storage cell 316 does not change.

Illustratively, only one of the set and clear signals can be a logic '1' at the same time. From an operational standpoint, the shared memory 214 requires at least one clock between transmitting an acknowledgement XACK of a successfully issued read command (which causes the set signal to be logic '1') and transmitting the label for the returned data (which causes the clear signal to be a logic '1').

When a logic '1' is transmitted in the set signal inputted to the storage cell 310, the multiplexer selects input number 1. This input receives the value transmitted in the set signal which is logic '1' in this case. Thus, a logic '1' is inputted to, and stored in, the flip-flop 316.

When a logic '1' is transmitted in the clear signal, the multiplexer also selects the input number 1. In this case, the set signal is a logic '0'. Thus a logic '0' is inputted to, and stored in, the flip-flop 316.

Figure 8:
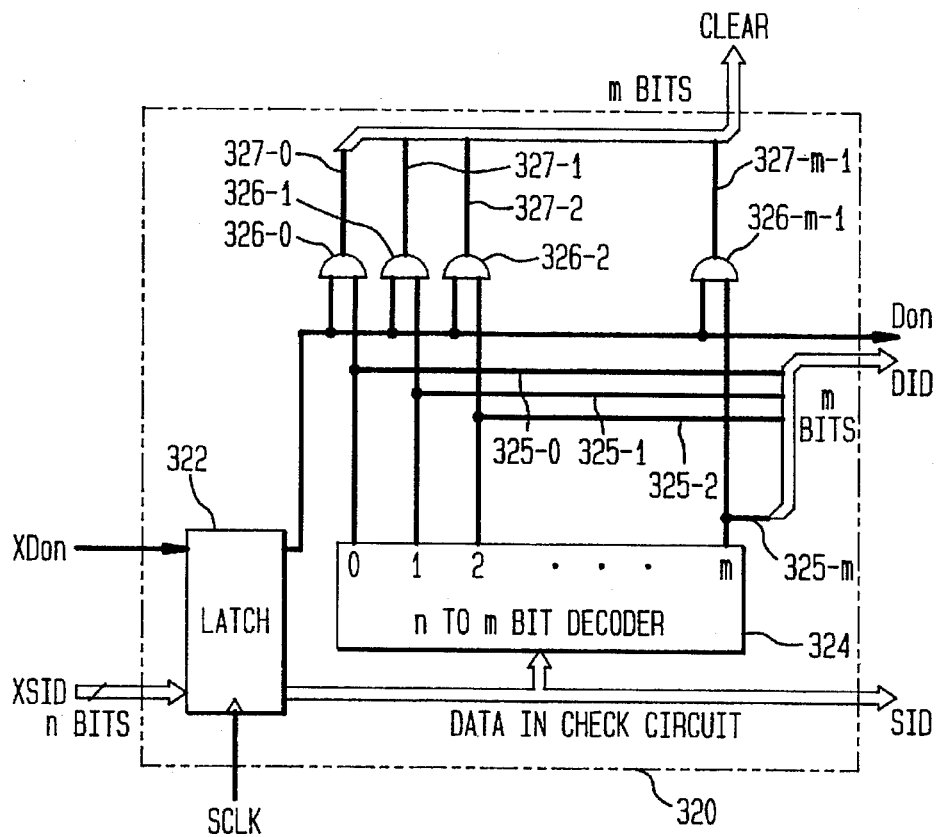
FIG. 8 shows an illustrative embodiment of the data-in check circuit of FIG. 5 in greater detail.

FIG. 8 shows an illustrative data-in check circuit 320. The data-in check circuit 320 has a latch 322 for receiving and storing the XSID and XDon signals. The latch 322 illustratively receives the system clock SCLK at its clock input. The SID and Don signals are outputted from the latch 322 after the delay of one system clock.

The SID signal outputted from the latch 322 is fed to an n to m decoder circuit 324. Such decoders are well known in the art. Illustratively, the SID signal is an n=five bit signal capable of indicating one of m=thirty-two labels. In such a case, the decoder 324 is a 5 to 32 bit decoder. The decoder 324 has one output line 325-0, 325-1, 325-2, . . . , 325-m-1 corresponding to each possible label that can be indicated by the SID signal. For instance, the output line 325-0 corresponds to the label '00000', the output line 325-1 corresponds to the label '00001', the output line 325-2 corresponds to the label '00010', etc. Collectively, the output lines 325-0 to 325-m-1 form the m bit DID signal mentioned above. The decoder 324 outputs a logic '1' on the output line 325-0, 325-1, 325-2, . . . , 325-m-1 corresponding to the label indicated by the SID signal.

Each output line 325-0 to 325-m-1 is inputted to a corresponding AND gate 326-0, 326-1, 326-2, . . . , 326-m-1. Furthermore, each AND gate receives the Don signal outputted from the latch 322. As a result, each AND gate outputs a logic '1' on a corresponding output line 327-0, 327-1, 327-2, . . . , 327-m-1 if the Don signal is a logic '1' and if a logic '1' is outputted on the corresponding line 325-0 to 325-m-1 of the decoder 324. These output lines 327-0 to 327-m-1 of the AND gates 326-0 to 326-m-1 collectively form the clear signal described above. Each clear signal line 327-0 to 327-m-1 corresponds to a particular label. Each clear signal 327-0 to 327-m-1 is connected to the clear input of the storage cell 120-0 to 120-m-1 (FIGS. 5, 7) of the first memory 120 corresponding to the same label as the signal line 327-0 to 327-m-1. Furthermore, each clear signal 327-0 to 327-m-1 is connected to the clear input of the storage cell 131-0 to 131-m-1 (FIGS. 5, 7) of the second memory 130 corresponding to the same label as the signal line 327-0 to 327-m-1. For instance, the clear signal line 326-6 corresponds to the label '00110' and is connected to the clear input of the cells 121-6 and 131-6 corresponding to the label '00110'.

Figure 9:
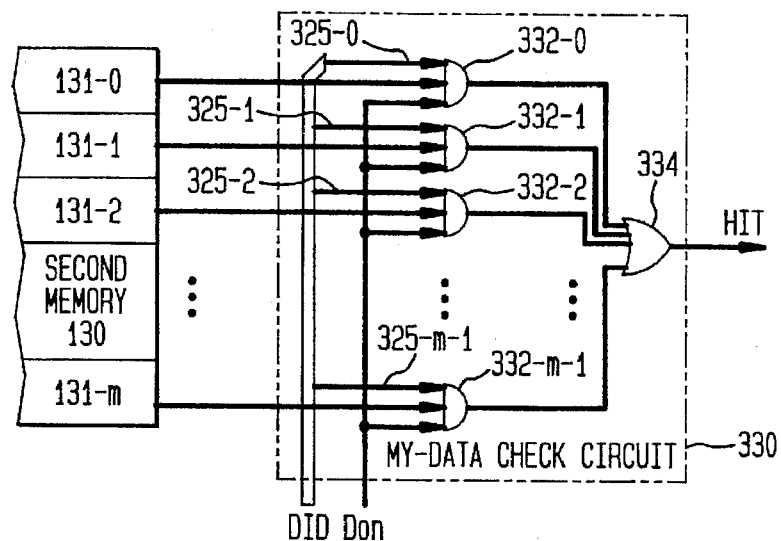
FIG. 9 shows an illustrative embodiment of the my-data check circuit of FIG. 5 in greater detail.

FIG. 9 shows an illustrative my-data check circuit 330 in greater detail. The my-data check circuit has one AND gate 332-2 332-1, 332-2, . . . , 332-m-1 corresponding to each possibly assignable label. Each AND gate 332-0 to 332-m-1 receives, as a first input, the DID signal line 325-0 to 325-m-1 corresponding to the same label as the respective AND gate 332-0 to 332-m-1. For instance, the signal line 325-2 corresponds to the label '00010' and is inputted to the AND gate 332-2 corresponding to the same label '00010'. Each AND gate 325-0 to 325-m-1 also receives, as a second input, the indication outputted from the storage cell 131-1 to 131-m-1 corresponding to the same label as the respective AND gate 332-0 to 332-m-1. Thus, in the above example, the AND gate 332-2 corresponding to the label '00010' receives the indication outputted from the storage cell 131-2 corresponding to the same label '00010'. Each AND gate 332-0 to 332-m-1 also receives the Don signal as a third input.

The shared memory 214 (FIG. 3) transmits a logic '1' in the XDon signal when transmitting a label. Furthermore, a logic '1' is transmitted on the DID signal line 325-0 to 325-m-1 corresponding to the label received from the shared memory 214 (FIG. 3). In addition, each storage cell 131-0 to 131-m-1 of the second memory 130 corresponding to a label assigned by the master 230 (FIG. 3) containing the labelling circuit 100 (FIGS. 4 and 5) outputs a logic '1'. All three inputs to an AND gate, e.g., the AND gate 332-1, are a logic '1', if and only if a label assigned by the master 230 (FIG.

3) was received from the shared memory 214 (FIG. 3). In such a case, the AND gate 332-1 outputs a logic '1'. Otherwise, the AND gate 332-1 outputs a logic '0'.

The outputted logic value from each AND gate 332-0 to 332-m-1 is received as an input to an OR gate 334. The output of the OR gate serves as the Hit signal. If any AND gate 332-0 to 332-m-1 outputs a logic '1', then the Hit signal is a logic '1' indicating that a label assigned by the master 230 (FIG. 3) was received from the shared memory 214 (FIG. 3).

Figure 10:
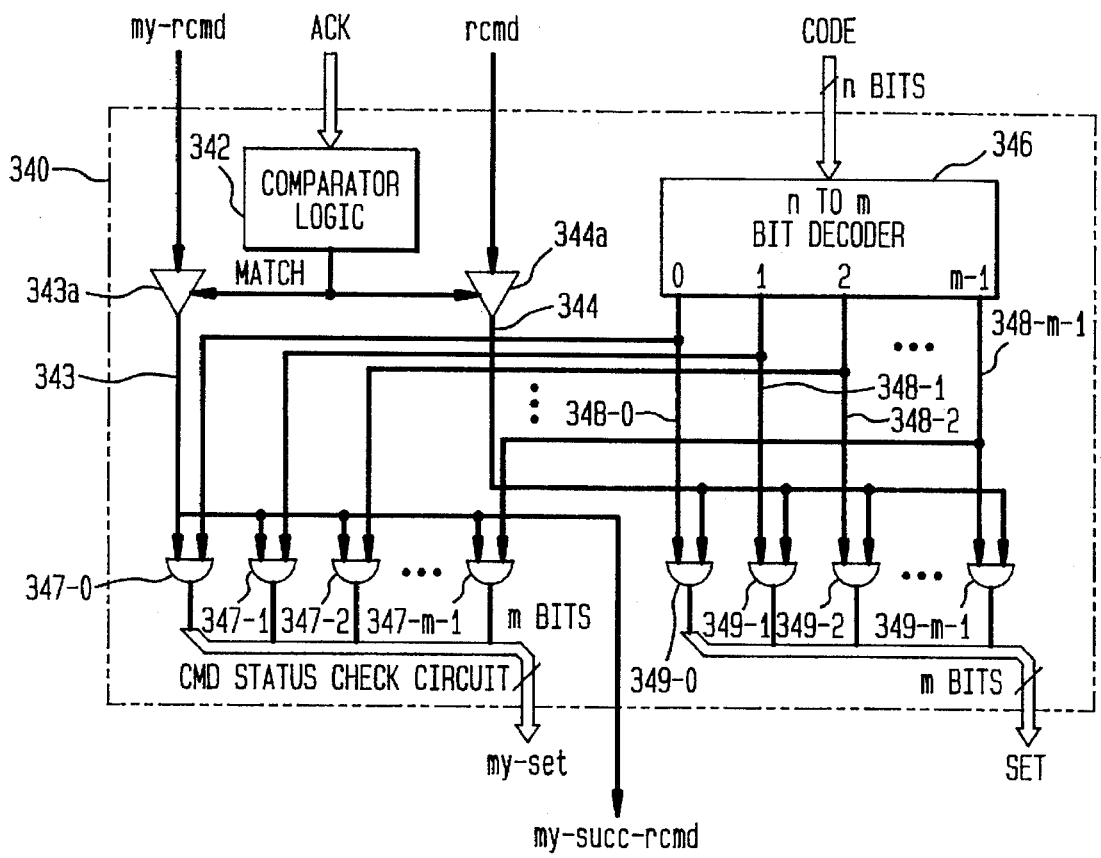
FIG. 10 shows an illustrative embodiment of the command status check circuit of FIG. 5 in greater detail.

FIG. 10 shows an illustrative command status check circuit 340 in greater detail. The command status check circuit 340 includes comparator logic 342 for determining when the shared memory 214 (FIG. 3) transmits an indication acknowledging receipt of a read command. Illustratively, such an acknowledgement is simply a predetermined data word which can be detected using a conventional comparator or pattern matching circuit. If the comparator logic 342 detects an acknowledgement, the comparator logic 342 outputs a match signal to the enable inputs of tri-state buffers 343a and 344a. The tri-state buffer 343a receives the rcmd signal and the tri-state buffer 344a receives the my-rcmd signal. If the rcmd signal indicates that another master 240 or 250 (FIG. 3) issued a read command, the tri-state buffer 344a (when enabled) generates a logic '1' on the signal line 343. If the my-rcmd signal indicates that the master 230 (FIG. 3) issued a read command, the tri-state buffer 344a (when enabled) generates a logic '1' on the signal line 344. At all other times, the tri-state buffers 343a and 344a output a logic '0' on the signal lines 343 and 344, respectively. The signal on the signal line 343 is also outputted from the command status check circuit as the my-succ-rcmd signal.

The command status check circuit also has an n to m bit decoder 346 where m=2^n=the number of different assignable labels. The decoder 346 receives the code signal outputted from the priority encoder 140 (FIG. 5). The decoder 346 has m output lines 348-0, 348-1, 348-2, . . . , 348-m-1 each of which corresponds to one label. The decoder 346 outputs a logic '1' on the output line 348-0 to 348-m-1 corresponding to the label indicated in the received code signal.

The command status check circuit 340 has a first group of m AND gates 347-0, 347-1, 347-2, . . . , 347-m-1. Each AND gate 347-0 to 347-m-1 corresponds to one label. Each AND gate 347-0 to 347-m-1 receives, as a first input, the signal outputted on the output line 348-0 to 348-m-1 corresponding to the same label as the AND gate 347-0 to 347-m-1. In addition, each AND gate 347-0 to 347-m-1 receives, as one input, the signal outputted on the signal line 343.

The outputs of the AND gates 347-0 to 347-m-1 collectively form the my-set signal. The output of each AND gate 347-0 to 347-m-1 is connected to a set input of a storage cell of the second memory 130 (FIG. 5) corresponding to the same label as the AND gate 347-0 to 347-m-1. Each AND gate 347-0 to 347-m-1 outputs a logic '1' if and only if the tri-state buffer 343a outputs a logic '1' on the signal line 343 and the decoder generates a logic '1' on the corresponding output line 348-0 to 348-m-1 connected thereto. Otherwise, the AND gates 347-0 to 347-m-1 output a logic '0'. Thus, a logic '1' is stored in the storage cell 131-1 to 131-m-1 of the second memory 130 (FIG. 5) corresponding to the label indicated by the code signal when the comparator logic 342 detects an acknowledgement for a command issued by the master 230 (FIG. 3).

Likewise, the command status check circuit 340 has a second group of m AND gates 349-0, 349-1, 349-2, . . . , 349-m-1. Each AND gate 349-0 to 349-m-1 corresponds to one label. Each AND gate 349-0 to 349-m-1 receives, as a first input, the signal outputted on the output line 348-0 to 348-m-1 corresponding to the same label as the AND gate 349-0 to 349-m-1. In addition, each AND gate 349-0 to 349-m-1 receives, as a second input, the signal outputted on the signal line 344.

The outputs of the AND gates 349-0 to 349-m-1 collectively form the set signal. The output of each AND gate 349-0 to 349-m-1 is connected to a set input of a storage cell of the first memory 120 (FIG. 5) corresponding to the same label as the AND gate 349-0 to 349-m-1. Each AND gate 349-0 to 349-m-1 outputs a logic '1' if and only if the tri-state buffer 344a outputs a logic '1' on the signal line 344 and the decoder generates a logic '1' on the corresponding output line 348-0 to 348-m-1 connected thereto. Otherwise, the AND gates 349-0 to 349-m-1 output a logic '0'. Thus, a logic '1' is stored in the storage cell 121-0 to 121-m-1 of the first memory 120 (FIG. 5) corresponding to the label indicated by the code signal when the comparator logic 342 detects an acknowledgement for a command issued by any master 230, 240 or 250 (FIG. 3).

Figure 11:
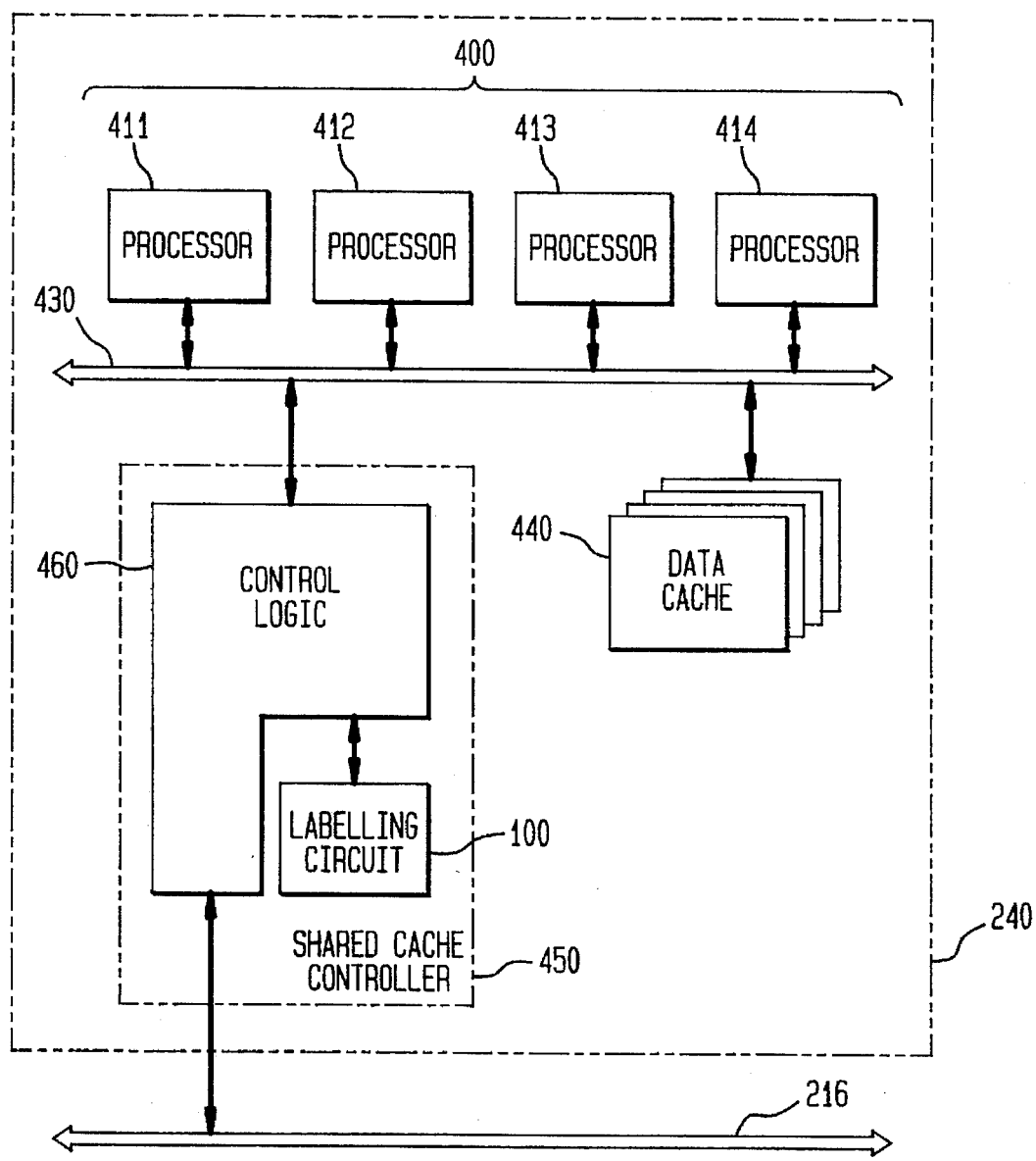
FIG. 11 shows a processor-cache cluster according to one embodiment of the present invention.

The labelling circuit 100 (FIG. 5) has been described above using an I/O bridge 230 as a master (FIGS. 3 and 4). FIG. 11 shows an alternative master 240 in the form of a processor-cache cluster 400. The processor-cache cluster 400 includes four processors 411, 412, 413 and 414 connected to an internal split transaction bus 430. Also connected to the bus 430 are an internal data cache 440 and a shared cache controller 450. The shared cache controller 450 has control logic 460 connected to the internal bus 430 and the system bus 216. The control logic 460 may be formed by intelligent digital finite state machines. The control logic 460 carries out a number of functions including receiving read commands from the processors 411–414, transferring data from the internal data cache 440 to the processors 411–414, and issuing read commands to an external cache and/or shared memory (not shown) if the data requested by the read commands issued by the processors 411–414 is not present in the internal data cache 440. In the course of attempting to satisfy read requests for the processors 411–414, the control logic 460 can have a number of outstanding read requests pending at the same time. To that end, the shared cache controller 450 has a labelling circuit 100 as discussed above for keeping track of each label assigned by a master connected to the system bus, for assigning an available label to each read command issued by the control logic 460 and for correlating returned data to its corresponding outstanding read command.

In summary, a method and system are disclosed for keeping track of requests from masters to utilize a shared resource wherein each master can have a number of outstanding requests to utilize the shared resource. According to the invention, a labelling circuit is disclosed for labelling each request issued by a particular master to utilize the resource. The labelling circuit includes a first memory for keeping track of each label assigned by each master to an outstanding request and for indicating a unique label available for assignment. The labelling circuit also has a first circuit for assigning the unique label indicated by the first memory to a request issued by the master containing the labelling circuit. For example, a second memory in communication with the first circuit may be provided for keeping track of each label assigned by the master containing the labelling circuit to an outstanding request. When the request is to be satisfied, e.g., when data is to be returned from the shared memory, a second circuit of the labelling circuit detects the label associated with the returned data. The second circuit receives this label and compares the received label to each label assigned to outstanding requests by the particular master containing the labelling circuit. By means of this comparison, the labelling circuit can correlate the outstanding request to the satisfaction of the request, e.g., returned data can be correlated with its respective read command.

Finally, the invention has been described above with reference to illustrative embodiments. Those having ordinary skill in the art may devise numerous other embodiments without departing from the spirit and scope of the following claims.

We claim:

1. A circuit for labelling outstanding requests to utilize a shared resource comprising:

a first plurality of storage locations for storing an assigned indication corresponding to each label assigned by each master of a computer system, said memory indicating a label available for assignment which is unique over each outstanding request of each master of said computer system, a first circuit, responsive to said label indicated by said memory, for assigning said indicated label to a request to utilize said shared resource issued solely by a particular master, and a second plurality of storage locations for storing an indication for each label assigned by said first circuit to each request issued solely by said particular master.

2. The circuit of claim 1 wherein, in response to detecting a request issued by any master of said computer system, said first circuit stores in said memory an assigned indication corresponding to each request issued by any master.

3. The circuit of claim 1 further comprising a priority encoder receiving, in parallel, each indication outputted from said memory and for outputting to a command status check circuit the lowest ordinal label not assigned by any master as said label which is unique.

4. The circuit of claim 1 further comprising a second circuit for, as each outstanding request is satisfied, receiving each label corresponding to a satisfied request from said shared resource and for clearing said indication stored in said memory corresponding to each of said received labels.

5. The circuit of claim 4 further comprising a third circuit for receiving, in parallel, each indication stored in said second memory, and for outputting an indication that a request of said particular master is satisfied for each label received by said second circuit for which said second memory stores an assigned indication.

6. The circuit of claim 4 wherein, in response to receiving each label of a satisfied request issued by said particular master, said second circuit clears a corresponding assigned indication stored in said second memory.

7. The circuit of claim 4 wherein said second circuit is a data-in check circuit comprising:

a latch for receiving each label received from said shared resource and a validity indication corresponding to said received label, an n to m bit decoder, where $m=2^n$, and m equals the number of possibly assignable labels, for receiving said label stored in said latch and outputting an m bit decoded label signal, where each of said m bits of said m bit decoded label signal corresponds to one of said possibly assignable labels, and a plurality of AND gates, including one AND gate corresponding to each possibly assignable label, each AND gate receiving, as a first input, one bit of said m bit decoded label signal corresponding to said same label as said AND gate, and receiving as a second input, said validity indication stored in said latch, each AND gate being capable of generating a signal for clearing an indication of said memory corresponding to said same label as said AND gate.

8. The circuit of claim 5 wherein said third circuit is a my-data check circuit comprising:

a plurality of AND gates including one AND gate corresponding to each possibly assignable label, each AND gate of said my-data check circuit receiving, as a first input, an indication stored in said second memory corresponding to said same label as said AND gate of said my-data check circuit, as a second input, one bit of said m bit decoded label signal of said data-in check circuit which bit corresponds to said same label as said AND gate of said my-data check circuit, and as a third input, said validity indication stored in said latch of said data-in check circuit, and an OR gate receiving an output from each AND gate of said my-data check circuit, said OR gate outputting said indication that an outstanding request issued by said particular master is satisfied.

9. A circuit for labelling outstanding requests to utilize a shared resource comprising:

a memory for storing an assigned indication corresponding to each unique label assigned by each master of a computer system, said memory indicating a label available for assignment which is unique over each outstanding request of each master of said computer system, a command status check circuit, responsive to said label, indicated by said memory, for assigning said indicated label to a request to utilize said shared resource issued by a particular master, said command status check circuit comprising:

comparator logic for determining if any of said masters of said computer system successfully issued a request to utilize said shared resource, said comparator logic enabling a first signal if any master successfully issued a request and a second signal if said particular master successfully issued a request, an n to m bit decoder, where $m=2^n$ and m equals the number of possibly assignable labels, said n to m bit decoder receiving said unique label and outputting an m bit signal where each of said m bits corresponds to one of said possibly assignable labels, and a plurality of AND gates including one AND gate corresponding to each possibly assignable label, each of said plurality of AND gates receiving, as a first input, one bit of said m bit signal corresponding to said same label as said AND gate, and as a second input, said first signal, each of said AND gates being capable of generating a signal for storing an assigned indication in said memory corresponding to said same label as said AND gate.

10. The circuit of claim 9 further comprising a second memory for storing an indication corresponding to each label assigned by said command status check circuit to a request of said particular master, said command status check circuit further comprising:

a second plurality of AND gates including one AND gate corresponding to each possibly assignable label, each of said second plurality of AND gates receiving, as a first input, one bit of said m bit signal corresponding to said same label as said AND gate, and as a second input, said second signal, each of said AND gates being capable of generating a signal for storing an assigned indication in said second memory corresponding to said same label as said AND gate.

11. The circuit of claim 1 wherein said memory comprises a plurality of storage cells including one storage cell corresponding to each possibly assignable label, each of said storage cells comprising:
 a flip-flop,
 a multiplexer receiving, as one input, said flip-flop output, and as a second input, a signal for storing an indication in said storage cell, said multiplexer output being connected to an input of said flip-flop, and
 an OR gate receiving as a first input, said signal for storing an indication in said storage cell, as a second input, a signal for clearing an indication stored in said storage cell, said OR gate output being connected to a selector input of said multiplexer.

12. The circuit of claim 1 wherein said shared resource is a shared memory and wherein said requests are read commands.

13. The circuit of claim 12 further comprising a RAM responsive to said first circuit for storing an address contained in the issued read command at a location of said RAM corresponding to said label assigned to said read command.

14. The circuit of claim 13 wherein said shared memory transmits said label of each satisfied read command, and an indication that said transmitted label is valid, when returning data read by said read command.

15. The circuit of claim 14 wherein, in response to receiving a label from said shared memory which was assigned by said first circuit to a read command issued by said particular master, outputting an address from said RAM corresponding to said received label.

16. In a computer system having at least one master, a method for correlating the satisfaction of each outstanding request issued by a particular master to its corresponding requests to utilize a shared resource comprising:
 at said particular master, assigning to each request issued by said particular master to utilize a resource a label which is unique over each outstanding request issued by each of said at least one masters,
 storing an assigned indication in a first plurality of storage locations at said master for each label assigned by each of said at least one masters of said computer system to an outstanding request, and
 storing in a second plurality of storage locations, a second assigned indication for each label assigned only by said particular master to each request issued solely by said particular master.

17. The method of claim 16 wherein said memory stores an available indication in each storage location other than those for which said memory stores an assigned indication, said method further comprising the step of selecting said unique label from said labels for which said memory stores an available indication.

18. The method of claim 17 wherein each label has a unique number and wherein said master selects the lowest numbered label for which said memory stores an available indication.

19. The method of claim 16 further comprising the step of:
 as each request is satisfied, transmitting to said master a label corresponding to said satisfied request.

20. The method of claim 1 further comprising the step of clearing said assigned indication corresponding to each received label of a satisfied request.

21. The method of claim 16 wherein said shared resource is a shared memory and wherein said request to utilize said shared resource is a command to read data from said shared memory.

22. The method of claim 21 further comprising the step of storing an address contained in each read command issued by said particular master in a storage location of a memory of said master corresponding to said label assigned to said read command in said step of assigning. cluster.

23. A master in a computer system comprising a labelling circuit for labelling outstanding requests to utilize a shared resource, said labelling circuit comprising:
 a memory for storing an assigned indication corresponding to each label assigned by each master of said computer system, said memory indicating a label available for assignment which label is unique over each outstanding request of each master of said computer system,
 a first circuit, responsive to said label indicated by said memory, for assigning said label indicated by said memory to a request to utilize said shared resource issued solely by said particular master containing said labelling circuit and
 a second memory for storing an assigned indication for each label assigned by said first circuit to each request issued solely by said particular master.

24. The master of claim 23 wherein said master is an I/O bridge.

25. The master of claim 25 wherein said master is a processor-cache cluster.

26. A computer system comprising:
 a system bus,
 a shared resource connected to said system bus, said shared memory receiving requests and satisfying requests via said system bus, and
 at least one master connected to said system bus, each at least one master comprising a labelling circuit for labelling outstanding requests to utilize a shared resource, said labelling circuit comprising:
  a memory for storing an assigned indication corresponding to each label assigned by each at least one master of said computer system, said memory indicating a label available for assignment which label is unique over each outstanding request of each at least one master of said computer system,
  a first circuit, responsive to said label indicated by said memory, for assigning said label indicated by said memory to a request to utilize said shared resource which request was issued by solely said particular master containing said labelling circuit, and
  a second memory for storing an assigned indication for each label assigned by said first circuit to each request issued solely by said particular master.

27. The apparatus of claim 1 wherein said issued requests are satisfied in an order that is independent of an order in which said requests issue from each master.

28. In a particular master of a computer system which supports split transactions and which supports satisfying requests to utilize a shared resource in order that is independent of the order in which such requests issue, a circuit for labelling outstanding requests to utilize a shared resource comprising:
 first circuitry for assigning a unique label to each request issued solely by said particular master to utilize a shared resource,
 a memory for storing at least one indication for each unique label assigned by each master of said computer system, and second circuitry for receiving, in an order that is independent of an order in which said outstanding requests issue, signals indicating that one of plural outstanding requests is satisfied and, in response to a label contained in said received signals and at least one indication stored in said memory, for identifying which outstanding request issued by only said particular master, if any, was satisfied.

29. The circuit of claim 30 wherein said memory comprises a first plurality of storage locations including one storage location corresponding to each label, for storing, for each request issued solely by said particular master, an indication for said label that indicates that said label corresponds to a request issued by said particular master, and wherein said second circuitry comprises comparator circuitry for comparing said label contained in said received signals to said labels for which an indication is stored in said first plurality of storage locations, that indicates that said label corresponds to a request issued by said particular master.

30. The circuit of claim 29 wherein said memory further comprises a second plurality of memory locations including one storage location corresponding to each label, for storing an indication for each label assigned by each master including said particular master.

31. In a particular master of a computer system which supports split transactions and which supports satisfying requests to utilize a shared resource in order that is independent of the order in which such requests issue, a method for labelling outstanding requests to utilize a shared resource comprising:

(a) assigning a unique label to each request issued solely by said particular master to utilize a shared resource, (b) storing at least one indication for each unique label assigned by each master of said computer system in a memory, (c) receiving, in an order that is independent of an order in which said outstanding requests issue, signals indicating that one of plural outstanding requests is satisfied, and (d) in response to a label contained in said received signals and at least one indication stored in said memory, identifying which outstanding request issued by only said particular master, if any, was satisfied.

32. The method of claim 31 further comprising the steps of:

(e) for each request issued solely by said particular master, storing, in a first plurality of storage locations including one storage location corresponding to each label, an indication for said label that indicates that said label corresponds to a request issued by said particular master, and (f) comparing said label contained in said received signals to said labels for which an indication is stored in said first plurality of storage locations, that indicates that said label corresponds to a request issued by said particular master.

33. The method of claim 32 further comprising the steps of:

(g) storing, in a second plurality of memory locations including one storage location corresponding to each label, an indication for each label assigned by each master including said particular master.

* * * * *